United States Patent
Xu

(10) Patent No.: US 11,051,273 B2
(45) Date of Patent: Jun. 29, 2021

(54) CONTROLLING FORWARD ERROR CORRECTION AND MODULATION CODING SCHEME FOR MULTICAST BROADCAST MULTIMEDIA SERVICES

(71) Applicant: Telefonaktiebolaget LM Ericsson (publ), Stockholm (SE)

(72) Inventor: Haogang Xu, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 96 days.

(21) Appl. No.: 16/611,588

(22) PCT Filed: May 8, 2017

(86) PCT No.: PCT/EP2017/060895
§ 371 (c)(1),
(2) Date: Nov. 7, 2019

(87) PCT Pub. No.: WO2018/206073
PCT Pub. Date: Nov. 15, 2018

(65) Prior Publication Data
US 2020/0163053 A1    May 21, 2020

(51) Int. Cl.
*H04H 20/71* (2008.01)
*H04W 72/00* (2009.01)
(Continued)

(52) U.S. Cl.
CPC .......... *H04W 72/005* (2013.01); *H04H 20/42* (2013.01); *H04L 1/0015* (2013.01); *H04L 1/0033* (2013.01); *H04L 2001/0093* (2013.01)

(58) Field of Classification Search
None
See application file for complete search history.

(56) References Cited

U.S. PATENT DOCUMENTS 8,644,207 B1 * 2/2014 Vivanco .................. H04W 4/06
370/312
9,351,128 B2 * 5/2016 Anchan ................. H04L 1/0002
(Continued)

FOREIGN PATENT DOCUMENTS

EP    2299739 A1    3/2011

OTHER PUBLICATIONS

International Search Report and Written Opinion of the International Searching Authority for PCT International Application No. PCT/EP2017/060895 dated Feb. 1, 2018.
(Continued)

*Primary Examiner* — Phuongchau Ba Nguyen
(74) *Attorney, Agent, or Firm* — Sage Patent Group

(57) ABSTRACT

A network node initiates a MBMS session providing a multimedia service through a RAN to UEs using a FEC operation providing an initial FEC level, where the multimedia service is concurrently provided through unicast sessions. Feedback reports received from the UEs identify UEs consuming the multimedia service through the MBMS session and identify UEs consuming the multimedia service through the unicast sessions. A ratio is determined of a number of the UEs identified as consuming the multimedia service through the MBMS session to a number of the UEs identified as consuming the multimedia service through the unicast sessions. Responsive to determining that the ratio is less than a target ratio, the FEC level provided by the FEC operation is increased. Responsive to determining that the ratio is greater than the target ratio by a defined margin value, the FEC level provided by the FEC operation is decreased.

20 Claims, 7 Drawing Sheets

(51) Int. Cl.
*H04H 20/42* (2008.01)
*H04L 1/00* (2006.01)

(56) References Cited

U.S. PATENT DOCUMENTS

| | | |
|---|---|---|
| 2013/0215813 A1 | 8/2013 | Kotecha et al. |
| 2013/0301424 A1 | 11/2013 | Kotecha et al. |
| 2014/0192698 A1 | 7/2014 | Anchan et al. |
| 2015/0189544 A1* | 7/2015 | Chen .................. H04L 12/1886 370/230 |
| 2016/0241615 A1 | 8/2016 | Chen et al. |

OTHER PUBLICATIONS

3GPP TS 23.246 V14.1.0, "3rd Generation Partnership Project; Technical Specification Group Services and System Aspects; Multimedia Broadcast/Multicast Service (MBMS); Architecture and functional description (Release 14)," Technical Specification, Dec. 2016, 76 pages.

\* cited by examiner

CONTROLLING FORWARD ERROR CORRECTION AND MODULATION CODING SCHEME FOR MULTICAST BROADCAST MULTIMEDIA SERVICES

CROSS REFERENCE TO RELATED APPLICATION

This application is a 35 U.S.C. § 371 national stage application of PCT International Application No. PCT/EP2017/060895, filed on May 8, 2017, the disclosure and content of which is incorporated herein by reference in its entirety.

TECHNICAL FIELD

The present disclosure relates to methods and operations by network nodes and user equipments in a communications system providing multimedia broadcast and multicast services.

BACKGROUND

Multimedia Broadcast and Multicast Services (MBMS) with MBMS Single Frequency Network (MBSFN)/Single-Cell Point-to-Multipoint (SC-PTM) is a promising technology to transport the same content to multiple UE receivers, and may become an important technology for TV broadcasting, Vehicle-to-Anything (V2X) communications, and Narrow Band Internet of Things (NB-IOT) communications.

Due to MBMS's one way multicast communication mechanism, application level Forward Error Correction (FEC) is normally needed to compensate for packet loss on the radio bearer. It is a formidable challenge to set the right level of FEC and Radio Access Network (RAN) Modulation Coding Scheme (MCS) to achieve the most efficient radio resource utilization.

SUMMARY

In known MBSFN/SC-PTM configurations, an eNB does not have real-time feedback from user equipments (UEs) of measured signal-to-noise ratio (SNR) to enable adjustment of the MCS. However, even if available, adjusting MCS based on SNR would provide a non-optimized service quality due to the small (e.g., 1 ms) protection period on RAN level. The MCS and FEC are conventionally statically configured to ensure the worst UE position is provided adequate service, but this approach leads to over provisioning of communication resources because the UEs are not always located in the area where the worst signal quality occurs and the signal quality changes over time with changes in the surrounding environment (e.g., interference changing due to changing neighboring cell loading). A systematic approach is needed to dynamically adjust application FEC and RAN MBSFN/SC-PTM MCS to provide acceptable level of service coverage based on the present service conditions for a UE.

Various embodiments disclosed herein can improve MBMS radio resource utilization efficiency. In some embodiments, the level of FEC and/or level of MCS used for a MBMS session can be optimized based on a ratio of a number of the UEs identified as consuming the multimedia service through the MBMS session to a number of the UEs identified as consuming the multimedia service through the unicast sessions.

In one embodiment, a method by a network node of a communications system, includes initiating a MBMS session for providing a multimedia service through a Radio Access Network (RAN) to UEs using a FEC operation providing an initial FEC level, where the multimedia service is concurrently provided through unicast sessions to UEs located in a coverage area of the MBMS session. The method includes receiving feedback reports from the UEs, where some of the feedback reports identify UEs that are consuming the multimedia service through the MBMS session and other of the feedback reports identify UEs that are consuming the multimedia service through the unicast sessions. The method includes determining a ratio of a number of the UEs identified as consuming the multimedia service through the MBMS session to a number of the UEs identified as consuming the multimedia service through the unicast sessions. Responsive to determining that the ratio is less than a target ratio, the method increases the FEC level provided by the FEC operation. Responsive to determining that the ratio is greater than the target ratio by a defined margin value, the method decreases the FEC level provided by the FEC operation.

In some further embodiments, the initial FEC level corresponds to a lowest FEC level.

In another related embodiment, a network node of a communications system, includes a network interface, a processor, and memory. The network interface is configured to communicate with UEs via a RAN. The processor is coupled to the network interface. The memory stores program code that is executed by the processor to perform operations. The operations include initiating a MBMS session for providing a multimedia service through the RAN to UEs using a FEC operation providing an initial FEC level, where the multimedia service is concurrently provided through unicast sessions to UEs located in a coverage area of the MBMS session. The operations include receiving feedback reports from the UEs, where some of the feedback reports identify UEs that are consuming the multimedia service through the MBMS session and other of the feedback reports identify UEs that are consuming the multimedia service through the unicast sessions. The operations include determining a ratio of a number of the UEs identified as consuming the multimedia service through the MBMS session to a number of the UEs identified as consuming the multimedia service through the unicast sessions. Responsive to determining that the ratio is less than a target ratio, the operations increase the FEC level provided by the FEC operation. Responsive to determining that the ratio is greater than the target ratio by a defined margin value, the operations decrease the FEC level provided by the FEC operation.

In another related embodiment, a network node of a communications system is configured to initiate a MBMS session for providing a multimedia service through the RAN to UEs using a FEC operation providing an initial FEC level, where the multimedia service is concurrently provided through unicast sessions to UEs located in a coverage area of the MBMS session. The network node receives feedback reports from the UEs, where some of the feedback reports identify UEs that are consuming the multimedia service through the MBMS session and other of the feedback reports identify UEs that are consuming the multimedia service through the unicast sessions. The network node determines a ratio of a number of the UEs identified as consuming the multimedia service through the MBMS session to a number of the UEs identified as consuming the multimedia service through the unicast sessions. Responsive to determining that the ratio is less than a target ratio, the network node increases the FEC level provided by the FEC operation. Responsive to determining that the ratio is greater than the target ratio by a defined margin value, the network node decreases the FEC level provided by the FEC operation.

Other methods by network nodes and network nodes according to embodiments will be or become apparent to one with skill in the art upon review of the following drawings and detailed description. It is intended that all such additional methods and network nodes be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
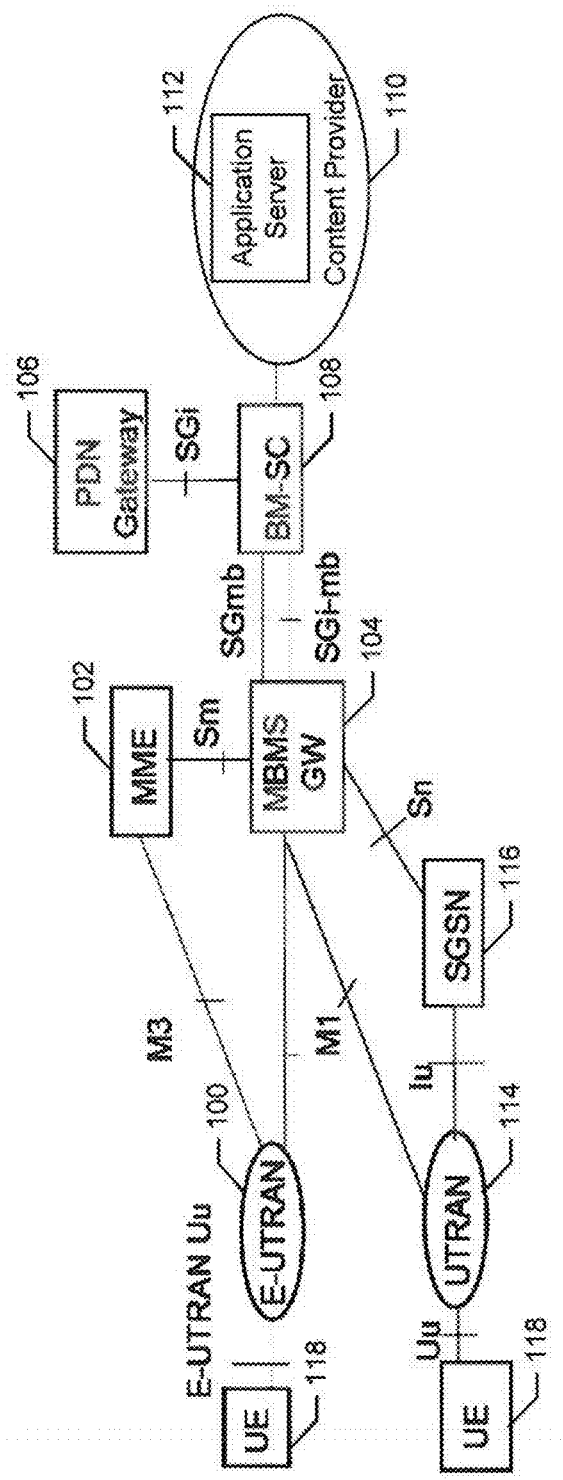
FIG. 1 illustrates a MBMS reference architecture communications system that is configured to operate according to various embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment. Any two or more embodiments described below may be combined in any way with each other.

Various embodiments of the present disclosure are directed to adjusting FEC, and in some embodiments further adjusting MCS, based on UE feedback to improve effective application data throughput of sessions. A Broadcast Multicast Service Center (BM-SC) or an application server starts a MBMS session with a defined lower level FEC encoding, e.g. 5%, and gradually increases the FEC until the percentage of UEs which receive acceptable broadcast services reaches a defined threshold. Additionally, the BM-SC or the application server can instruct a RAN to reduce MCS if the FEC is equal to or higher than a defined level to provide a threshold percentage of broadcast UEs. The BM-SC or application server for BM-SC may adjust the FEC and/or MCS based on the SNR feedback from UEs and/or based on the potential radio resource efficiency gain of the adjustment.

Potential advantages that can be provided by one or more of the embodiments disclosed herein can include, enabling dynamic adjustment of application encoding redundancy level (FEC) based on real-time UE signal quality measurement of BM-SC or application server sessions to provide a defined level of coverage at that time. RAN Turbo Codes or other MCS, and application layer encoding or other FEC, can be used together in an optimized way to provide the defined level of coverage. A UE may be maintained in an IDLE mode for maximum time durations to reduce the network load.

Generalizations

In some embodiments a non-limiting term UE is used. The UE herein can be any type of wireless device capable of communicating with a network node or another UE over radio signals. The UE may also be a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), USB dongles, Customer Premises Equipment (CPE), etc.

Also in some embodiments generic terminology, "radio network node" (RAN) or simply "network node (NW node) ", is used and can be any kind of node which may comprise of base station, radio base station, base transceiver station, base station controller, network controller, evolved Node B (eNB), Node B, Multi-cell/multicast Coordination Entity (MCE), relay node, access point, radio access point, Remote Radio Unit (RRU) Remote Radio Head (RRH), a core network node (e.g., TCE, MME, MDT node, MBMS node), or even an external node (e.g., 3rd party node, a node external to the current network), etc.

The term 'radio node' used herein may be used to denote a UE or a radio network node.

Embodiments disclosed herein are applicable to single carrier as well as to multicarrier or carrier aggregation (CA) operation of the UE in which the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

Operations and Methods by Network Nodes

FIG. 1 is a block diagram of a MBMS Reference Architecture communications system, which contains components some of which can operate as described in 3GPP 23.246 V14.1.0 Section 4. The communications system includes a content provider 110 having an application server 112 that provides a multimedia service to UEs 118 via MBSFN and/or SC-PTM operation modes. In the illustrated embodiment, the UEs 118 receive the multimedia service through a Radio Access Network (RAN). The multimedia service is concurrently provided through unicast sessions to UEs 118 located in a coverage area of the MBMS session. The application server 112 provides the multimedia service through a BM-SC (Broadcast Multicast-Service Centre) 108 connected to a PDN (Packet Data Network) Gateway 106, a MBMS GW (Multimedia Broadcast Multicast Services Gateway) 104, and a E-UTRAN (Evolved UMTS Terrestrial Radio Access Network) 100. A Mobility Management Entity 102 controls IDLE mode UE paging and chooses among switching gateways for use by UEs. The multimedia service can also be provided through the MBMS GW 104 and a SGSN (Serving GPRS Support Node) 116, and a UTRAN (Universal Terrestrial Radio Access Network) 114.

Figure 2:
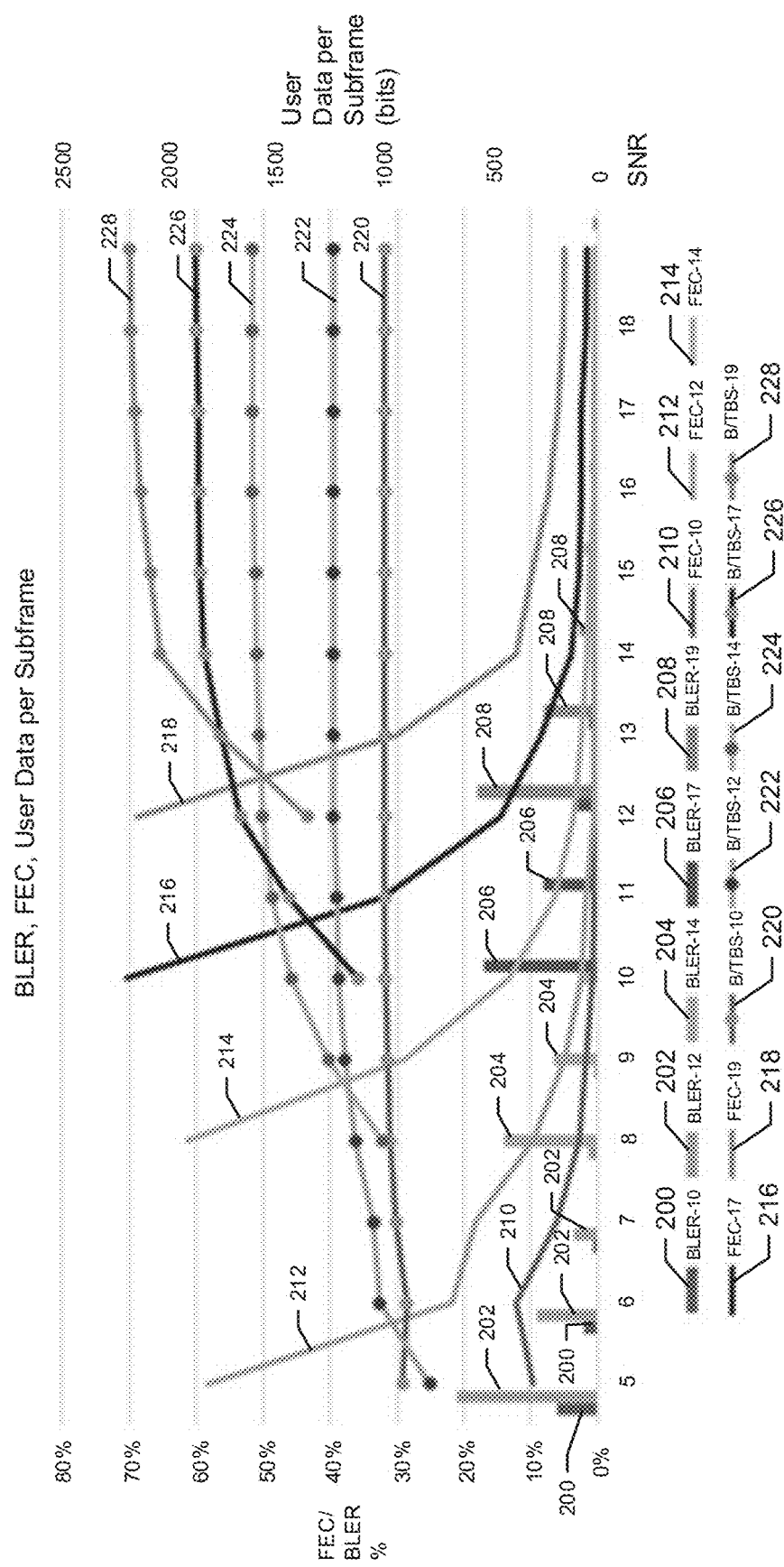
FIG. 2 illustrate a chart of effective user data size for particular Signal-to-Noise Ratios (SNRs), Modulation Coding Scheme (MCS), and minimum needed Forward Error Correction (FEC) in order to achieve a desired user data segment loss rate.

FIG. 2 illustrate a chart of effective user data per subframe size (illustrated as B/TBS-nn values represented on the right vertical axis) for particular Signal-to-Noise Ratios (SNRs), Modulation Coding Scheme (MCS), and minimum needed Forward Error Correction (FEC) in order to achieve a desired user data segment loss rate. The left vertical axis represents the FEC and Block Error Rate (BER) percentage. The horizontal axis represents the SNR. Relationships are illustrated for BLER-10 (200), BLER-12 (202), BLER-14 (204), BLER-17 (206), BLER-19 (208), FEC-10 (210), FEC-12 (212), FEC-14 (214), FEC-17 (216), FEC-19 (218), B/TBS-10 (220), B/TBS-12 (222), B/TBS-14 (224), B/TBS-17 (226), and B/TBS-19 (228).

The relationships illustrated by the plotted lines assume a 10 MHz band. One of the illustrated relationships is that a UE having a SNR of 8, MCS 13 and 27% FEC can be operated to achieve the maximum effective user payload according to the illustrated simulation relationship result, i.e., providing 1131 bytes of user data in one Transport Block with the size of 1431 bytes.

It is noted that application layer Raptor codes can spread protection over long intervals of time, whereas RAN Turbo codes only provide protection over very short intervals of time. Because channel conditions have less variance when measured over longer periods of time than shorter periods of time, the application layer Raptor codes are more efficient at recovering losses averaged over long intervals of time than the Turbo codes are at preventing losses over short intervals of time. Instead of provisioning the MBSFN/SC-PTM to ensure the worst area can have the normal 1% BLER offered by RAN, it is more efficient from a communication resource utilization basis to use a higher MCS to get a higher throughput with a little higher BLER rate, e.g. 6% BLER. The over-the-air loss may be recovered by using an appropriate level of application layer Raptor codes (e.g., FEC) in a more efficient operational manner. On the other hand, a very high MCS for a specific SNR should also be avoided, because a BLER rate higher than 10% will lead to even higher FEC redundancy to recover the loss. Based on the illustrated relationship for the previous example UE with SNR of 8, a MCS of 14 will lead to 14% BLER, and which will require 61% FEC in order to achieve the expected user segment loss rate (0.1% in the illustrated example). As shown in FIG. 2, only 1004 bytes of user data can be carried in one Transport Block, although the Transport Block size is increased to 1620 bytes. Various embodiments of the present disclosure are directed to operations and methods that may arise in view of the relationships illustrated in FIG. 2 which are configured to balance the FEC and MCS in order to achieve a more optimal communication radio resource utilization efficiency.

Figure 3:
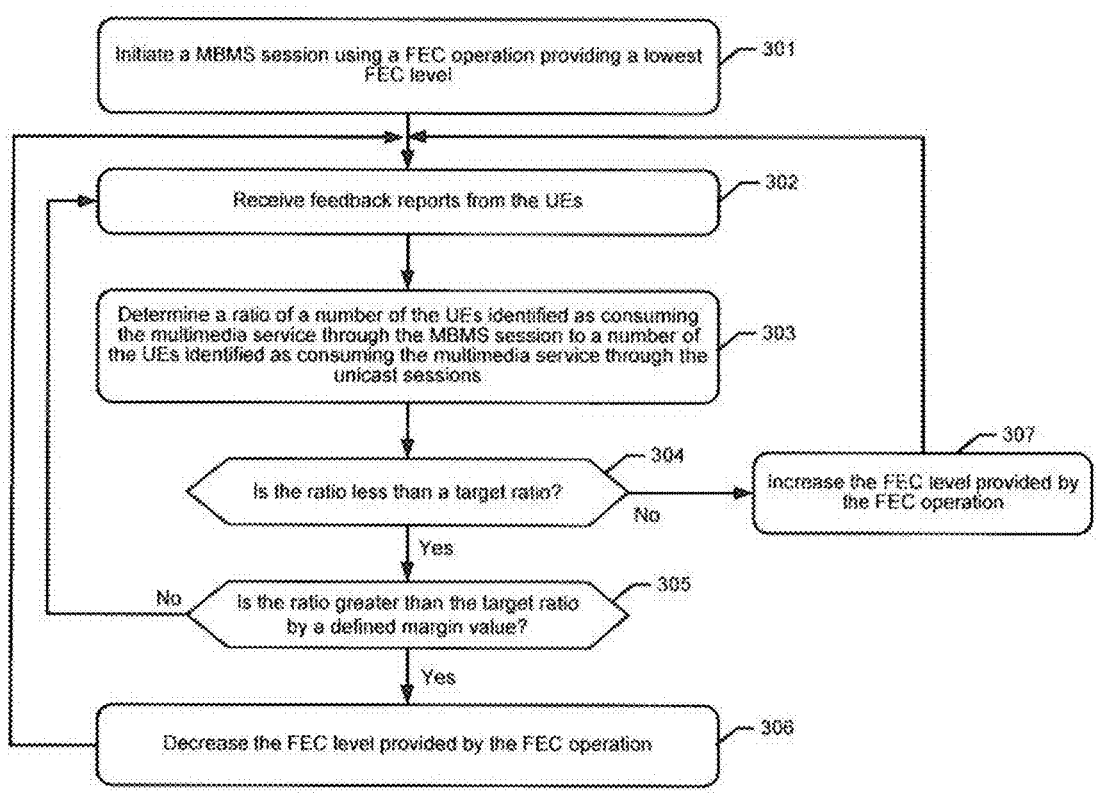
FIG. 3 illustrates operations and methods by a network node to adjust the FEC level for a multimedia service provided through a MBMS session to UEs according to various embodiments of the present disclosure.

FIG. 3 illustrates operations and methods by the BM-SC 108, the application server 112 (Content Provider), or another network node, to adjust the FEC level for a multimedia service provided through a MBMS session to UEs according to various embodiments of the present disclosure. The BM-SC 108 and Application server 112 are example network nodes, although the operations and methods disclosed herein as being performed by the BM-SC 108 or the application server 112 can additionally or alternatively be performed at least in part, or entirely, in another network node. The operations and methods may efficiently adjust FEC based on UE feedback to achieve a desired coverage with the lowest amount of radio resources for a fixed MCS configuration in the RAN. This can be particularly beneficial when used in an environment where more real-time adjustment of RAN MCS would be otherwise difficult.

Referring to FIG. 3, a MBMS session is initiated (301) for providing a multimedia service through a RAN to UEs using a FEC operation providing an initial FEC level, which typically is at a relative low level, such as e.g., 5%. The initial FEC level may be configured to be a lowest FEC level. The multimedia service is concurrently provided through unicast sessions to UEs located in a coverage area of the MBMS session. The initial FEC level that is initially used for the MBMS session for the area may be determined based on at least one of: an operator defined value; and historical statistics indicating what lowest FEC level has previously been sufficient to provide a defined quality level for multimedia service in a service area.

Feedback reports are received (302) from the UEs, where some of the feedback reports identify UEs that are consuming the multimedia service through the MBMS session and other of the feedback reports identify UEs that are consuming the multimedia service through the unicast sessions. After the multimedia service's session is initiated (301) in the specific area, UEs will detect that the session is broadcasted in the area by checking SIB13/MCCH, and those UEs will try to decode the broadcast session by applying the MBSFN or SC-PTM procedure. Some UEs will determine that they receive a sufficient level of broadcast service quality, and will responsively stop consuming the service through unicast and switch to the MBMS session for the multimedia service consumption. Those UEs then send feedback reports to the BM-SC 108 or the application server 112, indicating that the UEs have switched to the MBMS session for the multimedia service. Those UEs may also switch to IDLE mode if no other services require a unicast session.

Optionally, the UEs which are consuming the MBMS session may send feedback reports to the BM-SC 108 for the MBMS session consumption according to a defined longer schedule. Some UEs detect high MBMS session packet loss rate due to the poor SNR at the UEs' locations. These UEs will keep monitoring the MBMS session quality, and send feedback reports to the BM-SC 108 or the application server 112 indicating that they are consuming the multimedia service through unicast in their specific area(s) due to poor MBMS session quality.

A ratio is determined (303) of a number of the UEs identified as consuming the multimedia service through the MBMS session to a number of the UEs identified as consuming the multimedia service through the unicast sessions. The ratio may be determined (303) based on: 1) maintaining a first list of the UEs identified as consuming the multimedia service through the unicast sessions, responsive to quality levels reported in the feedback reports indicating which UEs did not receive the MBMS session with at least a threshold quality to be able to consume the multimedia service through the MBMS session; 2) maintaining a second list of the UEs identified as consuming the multimedia service through the MBMS session, responsive to quality levels reported in the feedback reports indicating which UEs received the MBMS session with at least the threshold quality to be able to consume the multimedia service through the MBMS session; and 3) determining the ratio of the number of the UEs identified as consuming the multimedia service through the MBMS session to the number of the UEs identified as consuming the multimedia service through the unicast sessions, based on the ratio of the number of the UEs in the second list to the number of the UEs in the first list. The ratio may be determined based on the number of the UEs in the second list to a combined number of the UEs in the first and second lists. A UE may be removed from the second list responsive to determining that at least a threshold time has expired since a last feedback report from the UE has been received.

The BM-SC 108 or the application server 112 responds to determining (304) that the ratio is less than a target ratio, by increasing (307) the FEC level provided by the FEC operation. In contrast, the BM-SC 108 or the application server 112 responds to determining (305) that the ratio is greater than the target ratio by a defined margin value, by decreasing (306) the FEC level provided by the FEC operation.

The determination (304) that the ratio is less than the target ratio, can include determining the percentage of the UEs identified as consuming the multimedia service through the MBMS session to the UEs identified as consuming the multimedia service through the unicast sessions. A typical MBMS deployment normally is designed to provide 90% coverage in the targeted area. With this service coverage goal, the BM-SC 108 or the application server 112 can set the threshold as 90% with a hysteresis value of 3%. For example, when there are 20 UEs in the first list, and 80 UEs in the second list, the actual ratio at that moment is 80%, which is smaller than 93%, so the FEC level is increased (307). In another example, when there are 4 UEs in the first list, and 96 UEs in the second list, the actual ratio at that moment is 96%, which is bigger than 93%, so the FEC level is decreased (306).

In one embodiment, the operations to increase (307) the FEC level provided by the FEC operation, can include increasing the FEC level by a first fixed step level, e.g. a fixed 5% step value that increases the FEC level from 5% to 10% to improve the broadcast session quality. Similarly, the operations to decrease (306) the FEC level provided by the FEC operation, can include decreasing the FEC level by a second fixed step level that can be different than the first fixed step level, e.g. decreasing from 20% to 15% to save radio resources.

In another embodiment, the operations to increase (307) the FEC level provided by the FEC operation, can include increasing the FEC level by a first step level determined based on SNR values for the MBMS session that are received in the feedback reports from at least some of the UEs. Similarly, the operations to decrease (306) the FEC level provided by the FEC operation, can include decreasing the FEC level by a second step level determined based on the SNR values, where the second step level can be different than the first step level. The first step level can be determined based on identifying how much the FEC level needs to increase so that a defined number of the UEs presently consuming the multimedia service through the unicast session will switch over to consuming the multimedia service through the MBMS session. The second step level can be determined based on identifying how much the FEC level needs to decrease so that a defined number of the UEs presently consuming the multimedia service through the MBMS session will switch over to consuming the multimedia service through the unicast session.

For example, assuming MCS 14 and FEC 5% is used for a MBMS session transmission. The BM-SC 108 or the application server 112 can decide to offer MBMS coverage for 90% of the UEs, and 10% of the UEs with the worst signal quality, i.e. lowest SNRs, consume the service through unicast instead. The BM-SC 108 or the application server 112 check the lowest SNR value for the remaining 90% of the UEs, SNR 8 in this example. Then the BM-SC 108 or the application server 112 can operate to decide to increase the FEC directly from 5% to 30% to attempt to ensure that the other 90% of the UEs can receive a sufficiently high broadcast session quality. With the radio signal quality feedback, the BM-SC 108 or the application server 112 can increase the system response speed for FEC optimization.

In another embodiment, the operations to increase (307) the FEC level provided by the FEC operation, can include increasing the FEC level by a first step level determined based on packet loss rates for the MBMS session that are received in the feedback reports from at least some of the UEs. Similarly, the operations to decrease (306) the FEC level provided by the FEC operation, can include decreasing the FEC level by a second step level determined based on the packet loss rates, the second step level can be different than the first step level.

The FEC level increase (307) may optionally be skipped, responsive to determining that the extra number of broadcast UEs that would be added by the increase does not satisfy a defined rule based on the needed extra dimensioned resources. For example, assuming MCS 14 and FEC 5% is used for a MBMS session transmission. In order to achieve 90% of UEs consuming MBMS threshold, the BM-SC 108 or the application server 112 would need to increase the FEC to 30% in order to cover 2 UEs with SNR 8. That would result in an extra 21% of radio resources being used for each cell in the 20 cells of the MBSFN cluster, i.e. 420% increase of the radio resources. It may be much more efficient to decide to keep the current FEC level, and where the 2 UEs continue using unicast for the multimedia service consumption.

Figure 4:
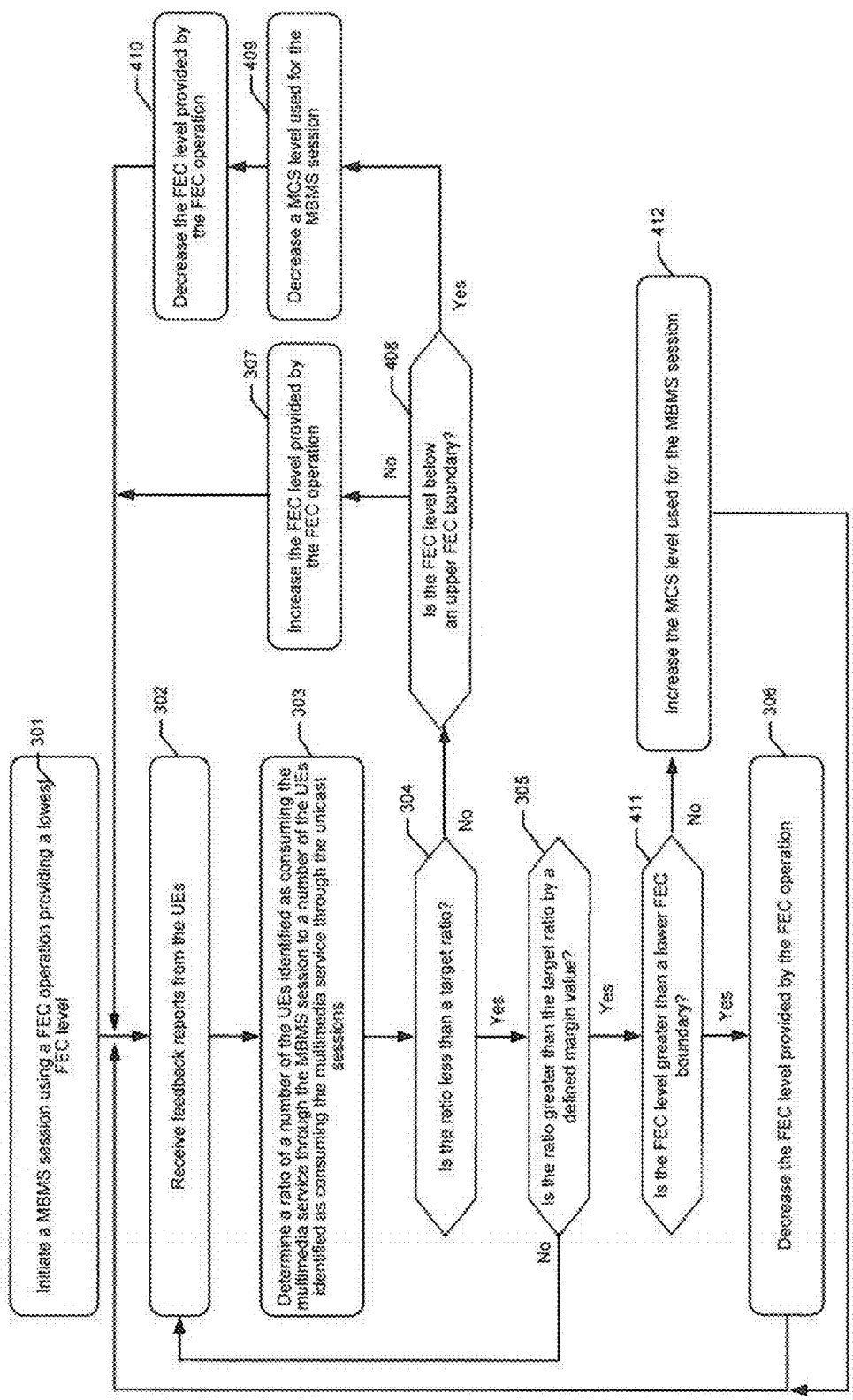
FIG. 4 illustrates further operations and methods by a network node to adjust the FEC level for a multimedia service provided through a MBMS session to UEs according to various embodiments of the present disclosure.

FIG. 4 illustrates further operations and methods by the BM-SC 108, the Application server 112, or another network node to adjust the FEC level for a multimedia service provided through a MBMS session to UEs according to various embodiments of the present disclosure. FIG. 4 is similar to FIG. 3, but extends the adjustment to include both FEC level and modulation and coding scheme (MCS) level, which may provide the expected UE coverage with the smallest amount of radio resources. The blocks shown in FIG. 4 having the same reference number as blocks in FIG. 3 can operate in the same manner as described above for FIG. 3. The description of these same numbered blocks is not repeated below for brevity.

Referring to FIG. 4, a MBMS session is initiated (301) to provide a multimedia service through a RAN to UEs using a FEC operation providing an initial FEC level. In some further embodiments, the initial FEC level corresponds to a lowest FEC level. Feedback reports are received (302) from the UEs. A ratio is determined (303) for a number of the UEs identified as consuming the multimedia service through the MBMS session to a number of the UEs identified as consuming the multimedia service through the unicast sessions.

The BM-SC 108 or the application server 112 responds to determining (304) that the ratio is less than a target ratio, by determining (408) whether the FEC level for the FEC operation is below an upper FEC boundary (e.g., 30%). Responsive to determining that the FEC level is below the upper FEC boundary, the BM-SC 108 or the application server 112 increases (307) of the FEC level provided by the FEC operation. In contrast, responsive to determining that the FEC level is not below the upper FEC boundary, the BM-SC 108 or the application server 112 decreases (409) a MCS level used for the multimedia service provided through the MBMS session (e.g., by informing the RAN to decrease the MCS level), and decreases (410) the FEC level provided by the FEC operation.

In one embodiment, the FEC level provided by the FEC operation is decreased (410) by an amount determined based on SNR values for the MBMS session that are received in the feedback reports from at least some of the UEs. In another embodiment, the FEC level is reset (410) to the initial FEC level.

Responsive to determining (305) that the ratio is greater than the target ratio by the defined margin value, the BM-SC 108 or the application server 112 determines (411) whether the FEC level for the FEC operation is greater than a lower FEC boundary (e.g., 5%). Responsive to determining that the FEC level is greater than the lower FEC boundary, the BM-SC 108 or the application server 112 performs the decreasing (306) of the FEC level provided by the FEC operation. The FEC level provided by the FEC operation may be decreased (306) by an amount determined based on SNR values for the MBMS session that are received in the feedback reports from at least some of the UEs. In contrast, responsive to determining that the FEC level is not greater than the lower boundary limit, the BM-SC 108 or the application server 112 increases (412) a MCS level used for the multimedia service provided through the MBMS session, e.g., by informing the RAN to increase the MCS level.

The amount by which the MCS level is increased (412) or decreased (409) may be set as a fixed value, e.g. 1. Optionally, UEs can also feedback the measured SNR values to the BM-SC 108 or the application server 112, and the BM-SC 108 or the application server 112 can use the SNR values to determine the amount by which the MCS level is to be increased (412) or decreased (409).

For example, assuming MCS 21 and FEC 20% is used for a MBMS session transmission. The BM-SC 108 or the application server 112 can decide to offer MBMS coverage for 90% of the UEs, and 10% of the UEs with the worst signal quality, i.e. lowest SNRs, consume the service through unicast instead. The BM-SC 108 or the application server 112 check the lowest SNR value for the remaining 90% of the UEs, which is SNR 14 in this example. Then the BM-SC 108 or the application server 112 can decrease the MCS directly to 19 (block 409), and decrease the FEC to 12% (block 410) to attempt to ensure that all of the other 90% of the UEs can receive sufficiently high MBMS session quality with minimum radio resources. With the extra SNR feedback from UEs, the MCS and FEC levels can be optimized more quickly.

The MCS level decrease in block 409 may optionally be skipped, if the extra number of added broadcast UEs does not justify the extra dimensioned resources. For example, assuming MCS 21 and FEC 20% is used for a MBMS session transmission. In order to achieve 90% of the UEs consuming broadcast threshold, the BM-SC 108 or the application server 112 needs to decrease the MCS to 19 and 30% FEC to cover 2 UEs with SNR 13. This would result in an extra 28% of radio resources being needed for each cell in the 20 cells of the MBSFN cluster, i.e. 560% increase of the radio resources. It may be much more efficient to keep the current MCS and FEC level, and the 2 UEs continue using unicast for the multimedia service consumption.

Adjustment of the MCS level (blocks 409 and/or 412) can be performed based on changing the ongoing session's MCS encoding directly though signaling to the RAN and/or by operations performed through an Operations & Maintenance (O&M) interface to the RAN. The MCS level may be adjusted by starting a new MBMS session with updated FEC and MCS parameters, and stopping the original MBMS session when all the UEs switch to the new MBMS session.

The operations of FIG. 3 and/or FIG. 4 can be repeated for each of a plurality of different MBMS sessions that are each provided to a different service area. The MBMS sessions may have a common temporary mobile group identifier (TMGI) and different flow identifiers.

Figure 5:
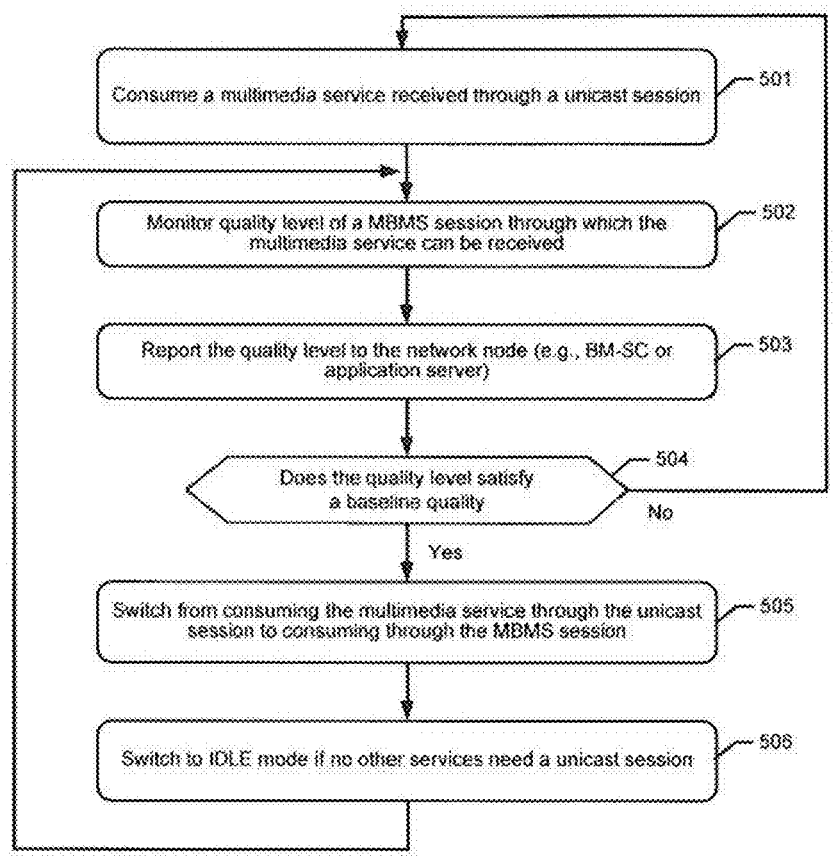
FIG. 5 illustrates operations and methods by a user equipment to monitor a multimedia service provided through a MBMS session and switch from consuming through a unicast session to consuming through the MBMS session.

FIG. 5 illustrates operations and methods by a UE to monitor a multimedia service provided through a MBMS session and switch from consuming through a unicast session to consuming through the MBMS session. The UE provides feedback reports that can enable the BM-SC 108 or the application server 112 to perform operations according to one or more of FIGS. 3 and 4 and other embodiments disclosed herein. The feedback reports can contain basic service quality information, which can include client identification, service identification, geography location description, and user service quality (e.g. segment loss rate). Optionally, the basic service quality information may include low level radio signal quality level measurements, e.g. SNR. The feedback reports can be provided by the UE more quickly if the UE is in CONNECTED mode. Otherwise, the UE can more infrequently provide the feedback reports according to a defined longer schedule, e.g. 20 mins.

Referring to FIG. 5, the UE consumes (501) a multimedia service received through a unicast session. The UE monitors (502) a quality level of a MBMS session through which the multimedia service can be received. The UE reports (503) the quality level to the BM-SC 108, the application server 112, or another network node. A determination (504) is made whether the quality level satisfies a baseline quality and, if so, the UE switches (505) from consuming the multimedia service through the unicast session to consuming the multimedia service through the MBMS session. The UE may switch (506) to IDLE mode if no other services it uses need a unicast session. The UE then continues monitoring (502) the MBMS session.

Example User Equipment and Network Node

Figure 6:
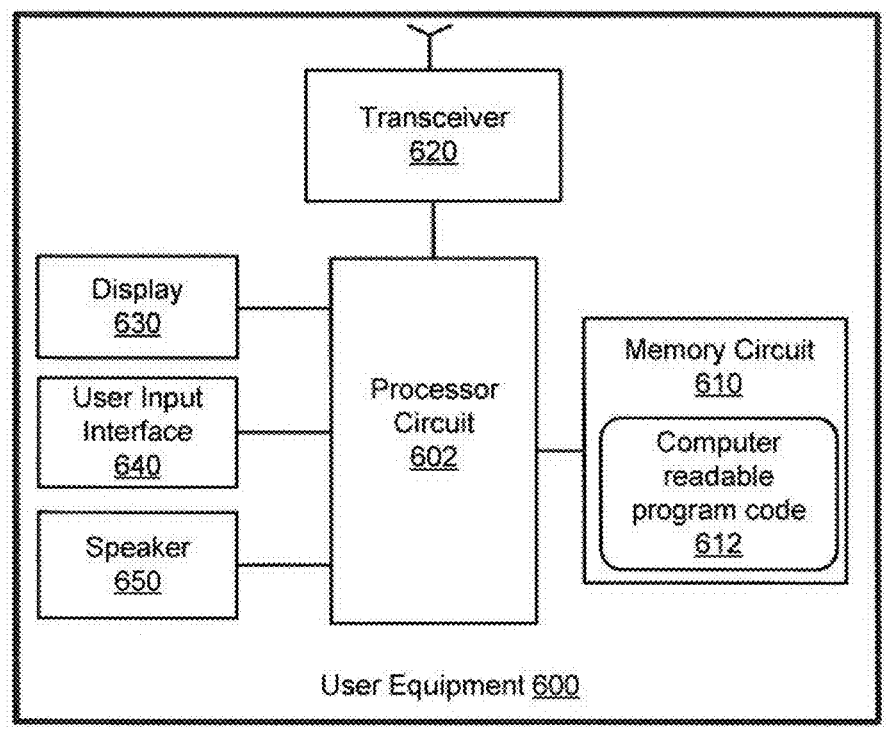
FIG. 6 is a block diagram of a UE, for use in a communications system, that is configured to perform operations according to one or more embodiments disclosed herein.

FIG. 6 is a block diagram of a UE 600, for use in a communications system, that is configured to perform operations according to one or more embodiments disclosed herein. The UE 600 includes a transceiver 620, a processor circuit 602 ("processor"), and a memory circuit 610 ("memory") containing computer readable program code 612. The UE 600 may further include a display 630, a user input interface 640, and a speaker 650.

The transceiver 620 is configured to communicate with RANs and may communicate with other UEs, through a wireless air interface using one or more of the radio access technologies disclosed herein. The processor circuit 602 may include one or more data processing circuits, such as a general purpose and/or special purpose processor, e.g., microprocessor and/or digital signal processor. The processor circuit 602 is configured to execute the computer readable program code 612 in the memory circuit 610 to perform at least some of the operations described herein as being performed by a UE.

Figure 7:
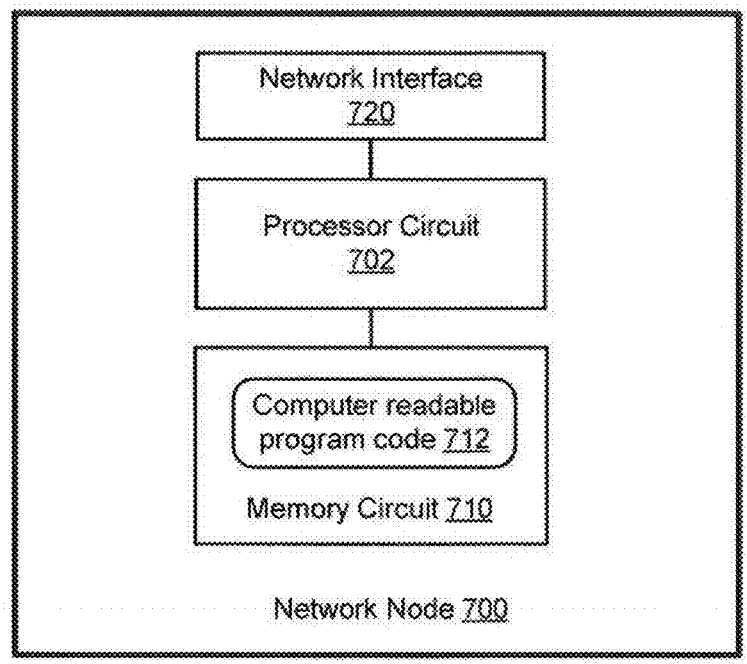
FIG. 7 is a block diagram of a network node, for use in a communications system, that is configured according to one or more embodiments disclosed herein for a network node.

FIG. 7 is a block diagram of a network node 700, for use in a communications system, that is configured according to one or more embodiments disclosed herein for a network node. The network node 700 may correspond to the BM-SC 108 or the application server 112. The network node 700 can include a network interface 720, a processor circuit 702 ("processor"), and a memory circuit 710 ("memory") containing computer readable program code 712.

The network interface 720 is configured to communicate with elements of the system of FIG. 1. The processor circuit 702 may include one or more data processing circuits, such as a general purpose and/or special purpose processor, e.g., microprocessor and/or digital signal processor, that may be collocated or distributed across one or more networks. The processor circuit 702 is configured to execute the computer readable program code 712 in the memory 710 to perform at least some of the operations and methods of described herein as being performed by a network node.

Figure 8:
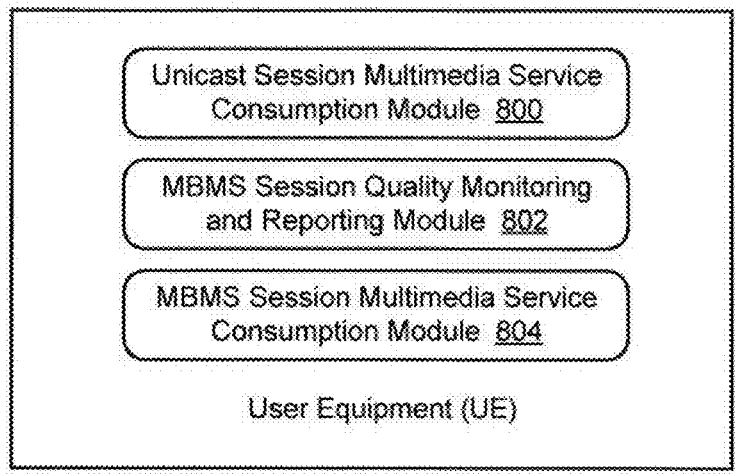
FIG. 8 illustrates modules residing in a UE, such as the UE of FIG. 6, that perform operations as disclosed herein according to some embodiments.

FIG. 8 illustrates modules residing in a UE, such as the UE 600 of FIG. 6, that perform operations as disclosed herein according to some embodiments. The UE includes a unicast session multimedia service consumption module 900, a MBMS session quality monitoring and reporting module 902, and a MBMS session multimedia service consumption module 904. The unicast session multimedia service consumption module 900 is configured to consume a multimedia service that is received through a unicast session with a network node, such as a BM-SC and/or an application server, via a RAN. The MBMS session quality monitoring and reporting module 902 configured to monitor quality level of a MBMS session with the network node via the RAN through which the multimedia service may be received, and report the quality level to the network node. The MBMS session multimedia service consumption module 904 configured to respond to determining that the quality level of the MBMS session satisfies a defined level, by switching from consuming the multimedia service through the unicast session to consuming the multimedia service through the MBMS session.

Figure 9:
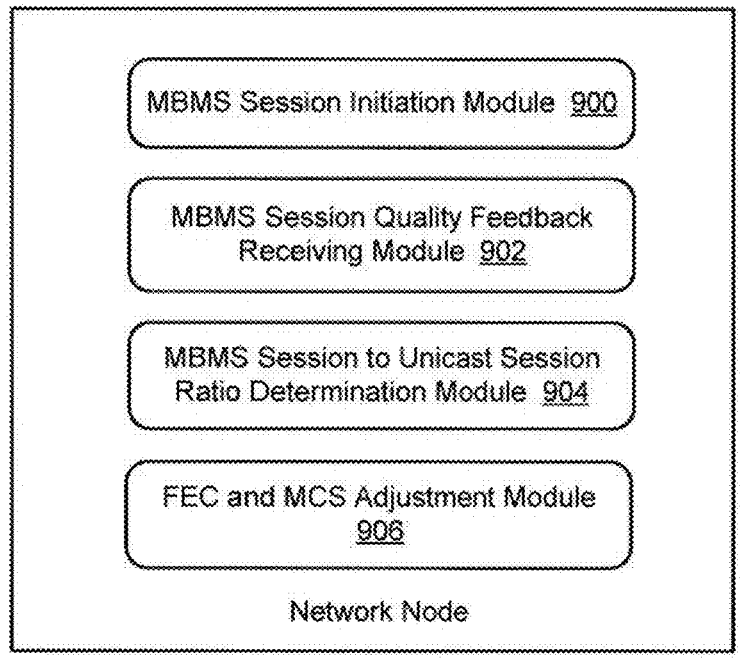
FIG. 9 illustrates modules residing in a network node, such as the network node of FIG. 7, that perform operations as disclosed herein according to some embodiments.

FIG. 9 illustrates modules residing in a network node, such as the network node 700 of FIG. 7, that perform operations as disclosed herein according to some embodiments. The network node includes a MBMS session initiation module 900, a MBMS session quality feedback receiving module 902, a MBMS session to unicast session ratio determination module 904, and a FEC and MCS adjustment module 906. The MBMS session initiation module 900 configured to initiate a MBMS session for providing a multimedia service through a RAN to UEs using a FEC operation providing an initial FEC level, where the multimedia service is concurrently provided through unicast sessions to UEs located in a coverage area of the MBMS session. The MBMS session quality feedback receiving module 902 configured to receive feedback reports from the UEs, some of the feedback reports identifying UEs that are consuming the multimedia service through the MBMS session and other of the feedback reports identifying UEs that are consuming the multimedia service through the unicast sessions. The MBMS session to unicast session ratio determination module 904 configured to determine a ratio of a number of the UEs identified as consuming the multimedia service through the MBMS session to a number of the UEs identified as consuming the multimedia service through the unicast sessions. The FEC and MCS adjustment module 906 configured to respond to determining that the ratio is less than a target ratio, by increasing the FEC level provided by the FEC operation. The FEC and MCS adjustment module 906 is further configured to respond to determining that the ratio is greater than the target ratio by a defined margin value, by decreasing the FEC level provided by the FEC operation.

Abbreviations

The following abbreviations are herewith defined, at least some of which are referred to within the following description of the present invention.

| Abbreviation | Meaning |
| --- | --- |
| 3GPP | Third Generation Partnership Project |
| BM-SC | Broadcast Multicast Service Center |
| BLER | Block Error Rate |
| CNs | Core Networks |
| EPS | Evolved Packet Systems |
| eMBMS | Enhanced MBMS |
| eMTC | enhanced Machine Type Communication |
| E-UTRAN | Evolved UMTS Terrestrial Radio Access Network |
| FEC | Forward Error Correction |
| MBMS | Multimedia Broadcast and Multicast Services |
| MBSFN | MBMS Single Frequency Network |
| MCE | Multi-cell/multicast Coordination Entity |
| MCPTT | Mission Critical Push To Talk |
| MCS | modulation and coding scheme |
| MME | Mobility Management Entity |
| MooD | Mbms Operation On Demand |
| NBIoT | Narrow Band Internet of Things |
| PC | Personal Computer |
| UE | User Equipment |
| RAN | Radio Access Network |
| SAI | Service Area Identity |
| SIB13 | System Information Block 13 |
| SNR | Signal to Noise Ratio |
| TMGI | temporary mobile group identifier |
| VoD | Video on Demand |
| V2X | Vehicle to Anything |

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BluеRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present disclosure may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by a network node of a communications system, the method comprising:
   initiating a Multimedia Broadcast and Multicast Services, MBMS, session for providing a multimedia service through a Radio Access Network, RAN, to user equipments, UEs, using a forward error correction, FEC, operation providing an initial FEC level, wherein the multimedia service is concurrently provided through unicast sessions to UEs located in a coverage area of the MBMS session;
   receiving feedback reports from the UEs, some of the feedback reports identifying UEs that are consuming the multimedia service through the MBMS session and other of the feedback reports identifying UEs that are consuming the multimedia service through the unicast sessions;
   determining a ratio of a number of the UEs identified as consuming the multimedia service through the MBMS session to a number of the UEs identified as consuming the multimedia service through the unicast sessions;

responsive to determining that the ratio is less than a target ratio, increasing the FEC level provided by the FEC operation; and
responsive to determining that the ratio is greater than the target ratio by a defined margin value, decreasing the FEC level provided by the FEC operation.

2. The method of claim 1, wherein determination of the ratio comprises:
maintaining a first list of the UEs identified as consuming the multimedia service through the unicast sessions, responsive to quality levels reported in the feedback reports indicating which UEs did not receive the MBMS session with at least a threshold quality to be able to consume the multimedia service through the MBMS session; and
maintaining a second list of the UEs identified as consuming the multimedia service through the MBMS session, responsive to quality levels reported in the feedback reports indicating which UEs received the MBMS session with at least the threshold quality to be able to consume the multimedia service through the MBMS session; and
determining the ratio of the number of the UEs identified as consuming the multimedia service through the MBMS session to the number of the UEs identified as consuming the multimedia service through the unicast sessions, based on the ratio of the number of the UEs in the second list to the number of the UEs in the first list.

3. The method of claim 2, wherein:
the ratio is determined based on the number of the UEs in the second list to a combined number of the UEs in the first and second lists.

4. The method of claim 2, further comprising:
removing a UE from the second list responsive to determining that at least a threshold time has expired since a last feedback report from the UE has been received.

5. The method of claim 1, wherein:
increasing the FEC level provided by the FEC operation, comprises increasing the FEC level by a first fixed step level; and
decreasing the FEC level provided by the FEC operation, comprises decreasing the FEC level by a second fixed step level that can be different than the first fixed step level.

6. The method of claim 1, wherein:
increasing the FEC level provided by the FEC operation, comprises increasing the FEC level by a first step level determined based on signal-to-noise ratio, SNR, values for the MBMS session that are received in the feedback reports from at least some of the UEs; and
decreasing the FEC level provided by the FEC operation, comprises decreasing the FEC level by a second step level determined based on the SNR values, the second step level can be different than the first step level.

7. The method of claim 6, wherein:
the first step level is determined based on identifying how much the FEC level needs to increase so that a defined number of the UEs presently consuming the multimedia service through the unicast session will switch over to consuming the multimedia service through the MBMS session.

8. The method of claim 6, wherein:
the second step level is determined based on identifying how much the FEC level needs to decrease so that a defined number of the UEs presently consuming the multimedia service through the MBMS session will switch over to consuming the multimedia service through the unicast session.

9. The method of claim 1, wherein:
increasing the FEC level provided by the FEC operation, comprises increasing the FEC level by a first step level determined based on packet loss rates for the MBMS session that are received in the feedback reports from at least some of the UEs; and
decreasing the FEC level provided by the FEC operation, comprises decreasing the FEC level by a second step level determined based on the packet loss rates, the second step level can be different than the first step level.

10. The method of claim 1, wherein the MBMS session is initiated using a FEC operation configured to provide a lowest FEC level that is determined based on at least one of: an operator defined value; and historical statistics indicating what lowest FEC level has previously been sufficient to provide a defined quality level for multimedia service in a service area.

11. The method of 1, further comprising:
responsive to determining that the ratio is less than the target ratio, performing:
determining whether the FEC level for the FEC operation is below an upper FEC boundary;
responsive to determining that the FEC level is below the upper FEC boundary, performing the increasing of the FEC level provided by the FEC operation; and
responsive to determining that the FEC level is not below the upper FEC boundary,
decreasing a modulation and coding scheme, MCS, level used for the multimedia service provided through the MBMS session, and
decreasing the FEC level provided by the FEC operation.

12. The method of claim 11, wherein:
the FEC level provided by the FEC operation is decreased by an amount determined based on signal-to-noise ratio, SNR, values for the MBMS session that are received in the feedback reports from at least some of the UEs.

13. The method of claim 11, wherein decreasing the FEC level provided by the FEC operation, comprises:
decreasing the FEC level provided by the FEC operation to the initial FEC level.

14. The method of claim 1, further comprising:
responsive to determining that the ratio is greater than the target ratio by the defined margin value, performing:
determining whether the FEC level for the FEC operation is greater than a lower FEC boundary;
responsive to determining that the FEC level is greater than the lower FEC boundary, performing the decreasing of the FEC level provided by the FEC operation; and
responsive to determining that the FEC level is not greater than the lower boundary limit,
increasing a modulation and coding scheme, MCS, level used for the multimedia service provided through the MBMS session.

15. The method of claim 14, wherein:
the FEC level provided by the FEC operation is decreased by an amount determined based on signal-to-noise ratio, SNR, values for the MBMS session that are received in the feedback reports from at least some of the UEs.

16. The method of claim 1, further comprising:

for each of a plurality of different MBMS sessions that are each provided to a different service area, repeating the initiating, the receiving, the determining, and one of the increasing and the decreasing.

17. The method of claim 16, wherein the MBMS sessions have a common temporary mobile group identifier, TMGI, and different flow identifiers.

18. The method of claim 1, wherein the network node comprises at least one of: a Broadcast Multimedia Service Center, BMSC; and an application server.

19. A computer program product comprising a non-transitory computer readable medium storing program code that when executed by a processor of a network node causes the network node to perform operations of claim 1.

20. A network node of a communications system, the network node comprising:

a network interface configured to communicate with UEs via a Radio Access Network, RAN;

a processor coupled to the network interface; and a memory comprising program code that is executed by the processor to perform operations comprising:

initiating a Multimedia Broadcast and Multicast Services, MBMS, session for providing a multimedia service through a Radio Access Network, RAN, to user equipments, UEs, using a forward error correction, FEC, operation providing an initial FEC level, wherein the multimedia service is concurrently provided through unicast sessions to UEs located in a coverage area of the MBMS session;

receiving feedback reports from the UEs, some of the feedback reports identifying UEs that are consuming the multimedia service through the MBMS session and other of the feedback reports identifying UEs that are consuming the multimedia service through the unicast sessions;

determining a ratio of a number of the UEs identified as consuming the multimedia service through the MBMS session to a number of the UEs identified as consuming the multimedia service through the unicast sessions;

responsive to determining that the ratio is less than a target ratio, increasing the FEC level provided by the FEC operation; and responsive to determining that the ratio is greater than the target ratio by a defined margin value, decreasing the FEC level provided by the FEC operation.

* * * * *